(12) United States Patent
Pietrowicz et al.

(10) Patent No.: US 10,097,417 B2
(45) Date of Patent: Oct. 9, 2018

(54) METHOD AND SYSTEM FOR VISUALIZING AND ANALYZING A FIELD AREA NETWORK

(71) Applicant: TT Government Solutions, Inc., Basking Ridge, NJ (US)

(72) Inventors: Stanley Pietrowicz, Freehold, NJ (US); Jason Youzwak, Somerset, NJ (US); John Haluska, Aberdeen, NJ (US); Seth Bromberger, San Franciso, CA (US)

(73) Assignee: Vencore Labs, Inc., Basking Ridge, NJ (US)

( * ) Notice: Subject to any disclaimer, the term of this patent is extended or adjusted under 35 U.S.C. 154(b) by 187 days.

(21) Appl. No.: 14/163,547

(22) Filed: Jan. 24, 2014

(65) Prior Publication Data

US 2014/0204799 A1    Jul. 24, 2014

Related U.S. Application Data

(60) Provisional application No. 61/756,336, filed on Jan. 24, 2013.

(51) Int. Cl.
*H04L 12/24* (2006.01)

(52) U.S. Cl.
CPC .............. *H04L 41/12* (2013.01); *H04L 41/22* (2013.01); *Y04S 40/164* (2013.01)

(58) Field of Classification Search
CPC ..... H04L 63/1408; H04L 41/22; H04L 45/02; H04L 45/74; H04L 41/12; H04L 41/14; H04L 45/00; H04L 43/12; H04L 47/823; H04W 64/00; H04W 4/028; H04W 40/02; H04W 40/246; H04W 84/18; H04W 24/04; H04W 24/08; Y04S 40/164

USPC .................................................. 370/255, 254
See application file for complete search history.

(56) References Cited

U.S. PATENT DOCUMENTS

| | | | | |
|---|---|---|---|---|
| 5,418,782 | A * | 5/1995 | Wasilewski | .................. 370/486 |
| 6,324,656 | B1 | 11/2001 | Gleichauf et al. | |
| 6,687,750 | B1 * | 2/2004 | Messinger | .............. H04L 41/22 703/6 |

(Continued)

OTHER PUBLICATIONS

Cisco Systems Inc., Internetworking Basics, 1998, Cisco Press. http://www.cisco.com/cpress/cc/td/cpress/fund/ith/ith01gb.htm#xtocid1668411.*

(Continued)

*Primary Examiner* — Kwang B Yao
*Assistant Examiner* — Ricardo Castaneyra
(74) *Attorney, Agent, or Firm* — Heslin Rothenberg Farley & Mesiti PC

(57) ABSTRACT

A method for visualizing and analyzing a field area network, which includes obtaining, network, traffic data that includes atomic communications and packet detail from a packet intercept system on a field area. This field area network includes a number of network nodes. The method also includes a processor extracting connectivity and routing information from the traffic data, where the connectivity and routing information includes packet information and node information, determining network characteristics based on the extracted connectivity and routing information, retaining the network characteristics in a data structure, and importing the data structure into a computer readable storage medium that is accessible to the processor.

20 Claims, 11 Drawing Sheets

(56) References Cited

U.S. PATENT DOCUMENTS

| | | | |
|---|---|---|---|
| 6,795,403 B1* | 9/2004 | Gundavelli | 370/256 |
| 6,906,709 B1 | 6/2005 | Larkin et al. | |
| 6,925,483 B1* | 8/2005 | Niemi | 709/201 |
| 6,958,977 B1 | 10/2005 | Mitrani et al. | |
| 7,174,566 B2 | 2/2007 | Yadav | |
| 7,274,305 B1 | 9/2007 | Luttrell | |
| 7,587,762 B2 | 9/2009 | Singhal et al. | |
| 7,975,046 B2 | 7/2011 | Sheppard | |
| 8,325,057 B2 | 12/2012 | Salter | |
| 8,521,904 B1* | 8/2013 | Pei et al. | 709/238 |
| 2002/0071438 A1* | 6/2002 | Singh | 370/398 |
| 2002/0161536 A1 | 10/2002 | Suh et al. | |
| 2004/0061701 A1* | 4/2004 | Arquie et al. | 345/440 |
| 2004/0167977 A1* | 8/2004 | Douglas et al. | 709/224 |
| 2004/0218548 A1* | 11/2004 | Kennedy | H04L 1/1685 370/254 |
| 2005/0289010 A1 | 12/2005 | Whittington et al. | |
| 2006/0123477 A1 | 6/2006 | Raghavan et al. | |
| 2007/0103324 A1* | 5/2007 | Kosuge | E03F 7/00 340/618 |
| 2007/0161371 A1* | 7/2007 | Dobrowski et al. | 455/423 |
| 2009/0116404 A1 | 5/2009 | Mahop et al. | |
| 2009/0138971 A1 | 5/2009 | Butti | |
| 2010/0138066 A1 | 6/2010 | Kong | |
| 2010/0217549 A1 | 8/2010 | Galvin et al. | |
| 2010/0232317 A1* | 9/2010 | Jing et al. | 370/254 |
| 2011/0035510 A1 | 2/2011 | Alexander | |
| 2011/0082599 A1 | 4/2011 | Shinde et al. | |
| 2011/0248857 A1 | 10/2011 | Rutherford et al. | |
| 2013/0227689 A1 | 8/2013 | Pietrowicz et al. | |
| 2014/0365196 A1* | 12/2014 | Melander et al. | 703/13 |

OTHER PUBLICATIONS

International Search Report and Written Opinion, International Application No. PCT/US2014/012970, dated May 19, 2014, 9-pages.

International Search Report and Written Opinion dated Apr. 24, 2013 from corresponding International Patent Application No. PCT/US2013/026497, 16 pages.

International Search Report and Written Opinion dated May 3, 2013 from corresponding International Patent Application No. PCT/US2013/026504, 15 pages.

International Application No. PCT/US2015/013051, International Search Report and Written Opinion, dated Jun. 10, 2015.

* cited by examiner

METHOD AND SYSTEM FOR VISUALIZING AND ANALYZING A FIELD AREA NETWORK

CROSS-REFERENCE TO RELATED APPLICATIONS

This application claims the benefit of U.S. Provisional Application No. 61/756,336, filed Jan. 24, 2013. The present application is related to PCT Patent Application No. PCT/US14/012970 entitled "METHOD AND SYSTEM FOR VISUALIZING AND ANALYZING A FIELD AREA NETWORK" filed on the date of filing of the present application, which is incorporated herein by reference in its entirety. The present application is also related to application Ser. No. 13/769,133 filed on Feb. 15, 2013. All of these applications are incorporated herein by reference, in their entireties.

BACKGROUND

1. Field of the Disclosure

The present disclosure relates to visualizing and analyzing data and control networks associated with a smart grid for electrical power distribution.

2. Description of the Related Art

Conventional systems for the generation, transmission, and distribution of electricity are well known. A power plant, or other source, generates electricity. The voltage is stepped up for distribution over high voltage transmission lines. The transmission lines are connected to substations, which step the voltage down to some intermediate voltage level. The power at this intermediate voltage level is distributed and further stepped down to a voltage that is delivered to homes and businesses.

Smart Grid is the modernization of the national electrical system to improve efficiency, integrate renewable generation sources, promote conservation, and better measure and manage the generation, transmission, distribution, consumption and potentially the storage of electricity. Much of the new technology in Smart Grid is focused on the electrical distribution network.

Key enablers for Smart Grid technology are intelligent embedded systems and communications in FANs. Intelligent embedded systems are small computer systems incorporated into power components that add sensor, control and monitoring capabilities. FANs enable communications among embedded system controllers and backend applications for measurements and control of Smart Grid components in the operation of the electrical system.

The Advanced Metering Infrastructure (AMI) is considered to be the leading edge of Smart Grid. AMI was the first large scale deployment of Smart Grid technology and involves deploying Smart Meters at every home and Communication Access Nodes or Access Points to support wireless communications among Smart Meters and backend applications. A Smart Meters is essentially a solid state computing and metering device with a network interface card. Smart Meter energy applications include remote meter reading, remote disconnect/connect, outage management, demand response, such as time of use pricing and direct load control, and customer engagement through home area networks (HANs).

Additionally, Smart Grid adds intelligent controls and sensors to distribution transformers, distribution feeders, and distribution substations to monitor asset state and condition, energy flow and to remotely control active components, such as switches, circuit reclosers, and capacitor banks. This portion of Smart Grid is known as Distribution Automation (DA).

Wireless networking technology is a popular means to support Smart Grid FAN communications due to the distributed nature of Smart Meters and DA electrical assets. Because Smart Meters and DA electrical assets coexist in the same physical territory, they may use the same or similar wireless networking technology for FAN communications.

There are a number of challenges present in managing and securing wireless FANs, such as those used in AMI and DA networks. First, FANs are wide area, multi-vendor, heterogeneous networks that combine a variety of wireless and wired technologies. Second, FANs constitute the largest network a utility will deploy and own. An AMI FAN can contain millions of Smart Meters that need to be managed over low bandwidth channels. Third, FANs operate in an unprotected environment. Intelligent endpoints cannot be physically protected very easily and they are often vulnerable to physical and cyber-attacks. Fourth, significant amounts of AMI and DA wireless technology are proprietary radio systems, which transport a mix of proprietary and standards-based networking protocols, some of which have yet to be adequately vetted from a security perspective. Fifth, because field equipment hardware updates and replacements are prohibitively expensive and since software updates cannot remedy all security vulnerabilities, utilities that operate FANs will ultimately have to manage multiple vintages of hardware, each with a different vulnerability profile. Some security vulnerabilities are inherent in the hardware and wireless communication. They cannot be eliminated and means to detect their potential exploitation are needed as part of comprehensive security program. Sixth, many of the new FANs, particularly for AMI, are adhoc, self-forming networks that are more dynamic than traditional IP networks and less understood on a large scale, such as in a Smart Meter deployment. In addition, FAN wireless technology is still quite immature and improvements are constantly being made to communications security, network performance, and routing, for instance.

Given all these challenges, there is a great need for network management and security tools akin to those commonly employed in IP enterprise networks to provide visibility, situational awareness and security monitoring. However, at present, no commercial solutions are available to monitor wireless FAN traffic and detect security anomalies/intrusion, network performance issues or even software bugs. Furthermore, there are no independent monitoring capabilities to help mitigate supply chain cyber risks in FAN components. All information about FANs is currently sourced through the application management tools provided by the Smart Grid component vendor, which would be unreliable if the vendor's supply chain was compromised.

Much of Smart Grid technology is still in its infancy. AMI, DA and FAN system providers are presently consumed by getting their claimed functionality to work. Little to no attention has been given to implementing network monitoring and intrusion detection systems. In addition, because many FANs use proprietary radio systems and protocols, none of the solutions commonly used for IP networks will work. Furthermore, whereas the industry understands the vulnerabilities in IP networks from years of experience, it is still in the discovery period with respect to the vulnerabilities in wide-area FANs.

Smart Grid FAN technology is new and no information is publically available on prior solutions. An analogy can be made, to a limited extent with network monitoring and intrusion detection in Wi-Fi networks. However, known commercial solutions intrusion detection in Wi-Fi networks do not operate via over-the-air captures. The geographic footprint of Wi-Fi networks is small in comparison to a Smart Meter network and Wi-Fi is built on an open, public standard.

SUMMARY

Shortcomings of the prior art are overcome and additional advantages are provided through the provision of a method for visualizing and analyzing a field area network. The method includes: obtaining, from a packet intercept system on a field area network, traffic data comprising atomic communications and packet detail, wherein the field area network comprises a plurality of network nodes; extracting, by a processor, connectivity and routing information from the traffic data, where the connectivity and routing information includes packet information and node information; determining network characteristics based on the extracted connectivity and routing information; retaining the network characteristics in a data structure; and importing the data structure into a computer readable storage medium accessible to the processor.

Computer systems, computer program products and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF THE DRAWINGS

FIG. 8 is screen shot example showing the packet filters and communications statistics based on filtered result in the MeshView application.

FIG. 9 illustrates a timeline view that shows the packets and communications as they appear in time in the MeshView application.

A component or a feature that is common to more than one drawing is indicated with the same reference number in each of the drawings. Reference numerals generally begin with the figure number of the figure in which the component or feature is first mentioned.

DESCRIPTION OF THE PREFERRED EMBODIMENTS

This disclosure is directed to a tool that is described in and may be used with the FAN system and apparatus referred in co-pending application Ser. No. 13/769,133 filed on Feb. 15, 2013, which is incorporated herein in its entirety. The text associated with FIG. 1A to FIG. 18 of that application describe the FAN system and its components in detail. The discussion of FIGS. 1A and 1C of that application are included below, as that related to FIGS. 1A and 1B herein, respectively. The discussion that follows is directed to the present disclosure, which describes a tool that can be used with the system and method of co-pending application Ser. No. 13/769,133, and is also disclosed in the text associated with FIGS. 19 to 27 of co-pending application Ser. No. 13/769,133.

Figure 1A:
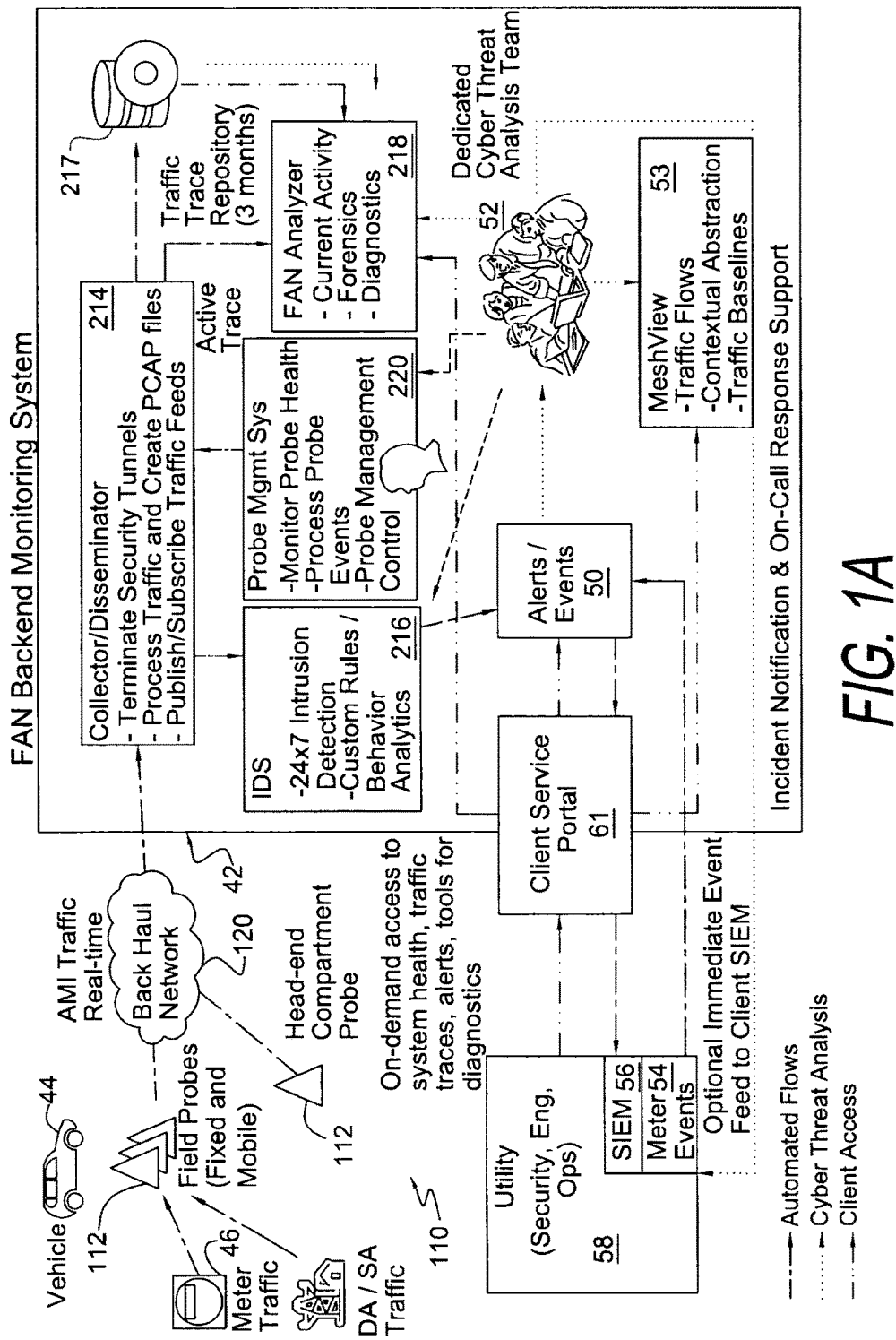
FIG. 1A is a high level block diagram of the FAN intrusion detection and monitoring system architecture.

FIG. 1A shows a high level block diagram of the FAN intrusion detection and monitoring system architecture. The FAN intrusion detection and monitoring system consists of two major subsystems, the field and headend probes and the FAN backend monitoring subsystem, shown generally as 42. The FAN intrusion detection and monitoring system can be installed and operated by a FAN owner such as a utility or provided as a hosted service, such as a managed security service, by another party. In the preferred implementation, the FAN intrusion detection and monitoring system is operated as a hosted managed security service that supports multiple FANs.

A multitude of probes 112 are inserted within the FAN 110 to intercept FAN traffic for backhaul and analysis by the FAN backend monitoring subsystem 42. Fixed external probes 112 can be located on any utility asset, such as poles, towers, substations and building or commercial and private residential structures given the permission of the property owner. Traffic from fixed probes is backhauled through commercial wireless networks (e.g., 3G or LTE) or existing utility tier 2 and 1 network facilities.

Fixed probes 112 can also be co-located or embedded into a subset of residential or commercial meters or HAN-enabled or load control devices within a Smart Grid home area network. HAN-enabled devices typically inform rate payers of energy usage, time of use charges or demand response actions. Meter and HAN device probes provide the advantage of convenient access to power, as well as a less harsh physical environment. In addition, commercial meters typically have data connectivity, which can be used by the probe. Although residential Smart Meters have AMI data connectivity, it is preferable to use a separate network for probe communications to maintain independence of probe communications from AMI communications for supply chain integrity and to avoid overloading bandwidth-limited AMI networks. Meter and HAN-based probes would generally use commercial wireless service for traffic backhaul, unless customers permitted use of their fixed broadband connections.

Mobile probes are installed in fleet vehicles 44 of utilities or on any vehicle that agrees to become a host for a mobile probe. In towns where municipalities own and operate their own electrical infrastructure, probes 112 may be placed in municipal vehicles, including garbage trucks, police cars, street sweepers and road maintenance vehicles. Mobile probes may also be placed in commercial vehicles, such as taxis and delivery trucks. The main requirement is the vehicle move within the utility service territory where the FAN 100 is located. A benefit of using utility and service trucks is that they are usually already equipped with wireless data connectivity and global positioning system tracking devices, which can be used by the mobile probes.

Mobile probes backhaul traffic via commercial wireless networks or store the traffic for later upload upon the vehicle returning to its storage point, at which time its traffic may be uploaded via local Wi-Fi service or manually using USB memory stick transfer, thereby eliminating the need for wide area network connectivity.

Headend probes 112 are placed within the FAN headend compartment to intercept all the traffic between the access points (described below) and the headend management system. Headend probe traffic is transmitted to the over any convenient network with sufficient bandwidth; typically a wired IP network.

The field probes 112 receive traffic from meters and receive DA/SA traffic. Real time AMI traffic from the probes 112 is sent to FAN backend monitoring subsystem 42 via a backhaul network 120 to a collector/disseminator 214. Data from collector/disseminator 214 is disseminated to an intrusion detection system IDS 216, a FAN analyzer 218, and a traffic trace repository 217 (FIG. 14), which stores the traffic for a period of generally three months. A probe management system 220 communicates with collector/disseminator 214. IDS 216 logs alerts and events at 50. Such Alerts and events are also received from a client service portal or user portal 61 and forwarded to a dedicated cyber threat analysis team, shown at 52, who analyze threats and provide input to the FAN analyzer 218. Input from cyber threat analysis team 52 and from the client service portal or user portal 61 is also forwarded to the MeshView application 53 described below, as well as to a meter events portion 54 of a security information and event management (SIEM) application 56 within a utility 58 that includes security, engineering and operations functions, These components, and their functions, are described below.

Figure 1B:
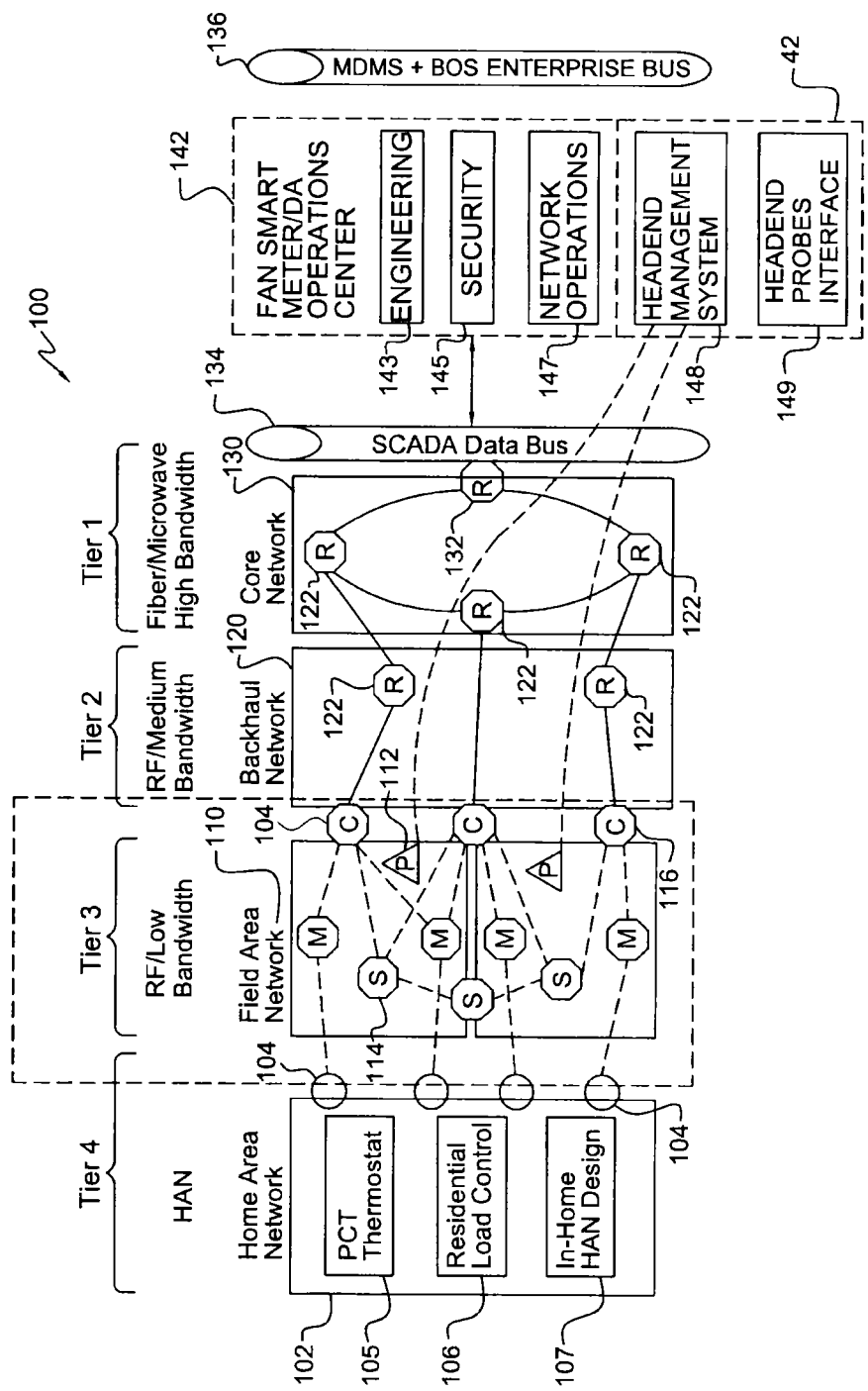
FIG. 1B shows how the FAN IDS system can overlay on a utility network infrastructure.

FIG. 1B shows how the probes and FAN backend monitoring system overlay on a typical tiered utility network infrastructure. At the lowest level, a home area network (HAN) 102 for a home or building has associated with it one or more advanced or smart meters 104 and HAN-enabled devices, such as at least one programmable communicating thermostat (PCT) 105, at least one residential load control device 106 and an in house. The smart meters and DA devices communicate via a FAN 110 that transports meter, HAN and distribution automation traffic by low bandwidth RF communication among meters 104, access points 116, relays 117, and sensors and distribution automation controls 114. Access points 116 act as gateways that transition FAN traffic to Wide Area Network (WAN) traffic for backhaul to the headend system for utility applications. The WAN may consist of commercial wireless networks that connect the access points to the utility backend infrastructure or a combination of tier 2 local networks 120 at substations that in turn connect to the utility backend via a core tier 1 network 130 compromised of fiber or microwave systems.

Data from FAN 110 is communicated by generally medium bandwidth RF communication to backhaul network 120. Backhaul network 120 can include a series of routers 122 to facilitate moving data to a core network 130 which may use fiber optics or microwave communication. A router 132 routes data to a supervisory control and data acquisition (SCADA) equipment 134. The traffic is then sent to a FAN smart meter/DA operations center 142 including engineering 143, security 145 and network operations 147, Probe data is transmitted to FAN backend monitoring subsystem 42, which includes a headend management system 148 and a headend probes interface 149. Data is available on a model driven monitoring system (MDMS) data bus 152.

As previously mentioned, probes are inserted in various locations within the FAN, HAN and headend system compartment. Probe traffic is backhauled over commercial wireless networks, tier 2 and 1 utility networks and potentially customer broadband access to the FAN backend monitoring subsystem. The FAN backend monitoring subsystem can be located in the utility data, network operations or security operations center, existing in or near the headend management compartment or at another party's site, such as in a hosted solution.

Fixed probes are inserted into the FAN using a variety of deployment strategies. One strategy is to deploy probes in areas of high meter density. A second strategy is deploy probes in areas where crime rates are high or where energy theft and equipment tampering has occurred historically. A third strategy is to deploy probes in areas where there is distribution automation equipment to be able to monitor over-the-air DA and AMI communications near sensitive equipment. A fourth strategy is to deploy probes near sensitive commercial and government facilities, such as industrial centers, critical infrastructure, government offices and military bases. A fifth strategy is to deploy probes at the intersection of multiple access point coverage zones so as to cover the traffic for three or four access points with a single probe given sufficient line of sight range. The probes are designed with RF front-ends superior to the Access Points and can reach greater distances. Finally, a sixth strategy is deploy probes so that one is co-located with every access point.

Fixed probes do not need to be deployed to provide full geographic coverage of the FAN. Mobile probes are used as a means to sample traffic from all over the service territory, making use of fleet vehicles owned by the utility or another party, such as municipal vehicles, taxis or delivery trucks that agree to install probes.

Figure 2:
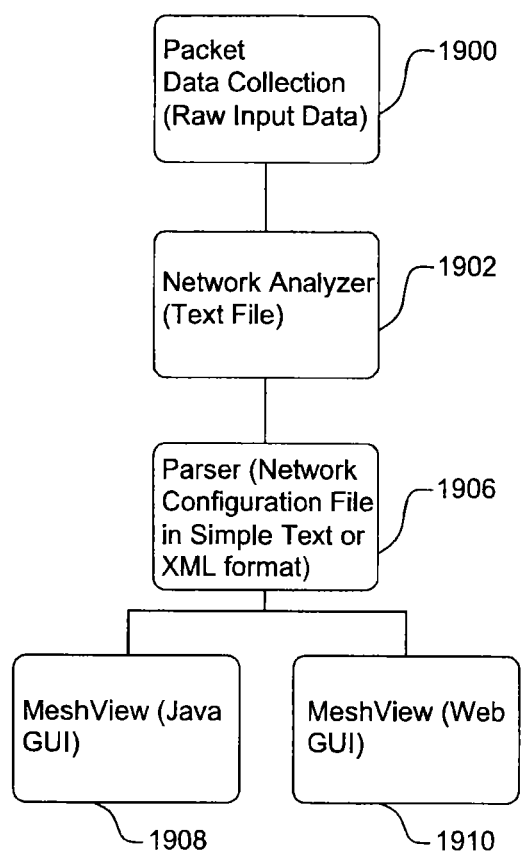
FIG. 2 is a diagram of a set of hardware and software components of a MeshView application data processing flow.

Referring to FIG. 2, one of the tools referred to in FIG. 17 of co-pending application Ser. No. 13/769,133, is the MeshView™ application, which is a network analysis and visualization tool that abstracts information about network topology and end-to-end communications flow in FANs from the atomic communications and low level packet detail captured by a packet intercept system. A key feature of the MeshView application is that it constructs the logical and GIS-based connectivity and routing maps of FAN subnets based on traffic observations, which do not require full band capture, i.e. a sampling of channels over time in a frequency hopping system can be used to render the network topology, routing and connectivity diagrams. Another key feature of the MeshView application is the ability to apply powerful filters to the traffic observations to distill specific traffic of interest in the analysis and visualization. Yet another feature of the MeshView application is the ability to show a timeline of packet transmissions based on packet timestamp and to replay packets to observe the time sequence of the communication. The replay functionality is applied to the routing maps to observe how AP subnet routes form, change, and degrade over time in both the logical and GIS-based map views. Yet another feature of the MeshView application is to create baseline traffic statistics for each probe to establish normal operation. The MeshView application also has the ability to allow users to view the route taken by a mobile probe on a GIS-based map. The MeshView application also provides filters to allow users to select a geographic area as a filter to produce results based only on packets received, transmitted or intercepted in that area.

The MeshView application extracts information to determine network characteristics from the physical frame, link layer, mesh routing layer (a layer 2.5 protocol that is often a custom layer), a packet encapsulation layer where IPv4 or IPv6 packets are encapsulated in mesh packets, and the application layer. The physical frame provides attributes such frequency channel, and virtual network ID. The link layer provides sources and destination of direct node-to-node communication, type of packet, and timing information about where nodes will hop at a future point in time, among other info. Handshake packets that are linked in time and frequency are used to infer source and destination addresses when not present in packets. Layer 2.5 provides information on source routed packets and relaying of packets through one or more nodes to reach a destination within the mesh. Layer 2.5 also provides information about a node's chosen next hop. IP addresses in the encapsulation layer provides information on communication flows that typically cross between the mesh into backend networks beyond the access point gateway or cross nodes that have different access points. The application layer provides information about node configuration, key network server addresses, and events.

FIG. 2 is a high level diagram of the process by which packet traces are converted into information analyzed by MeshView and presented to the application user. The traffic traces are collected and formatted in PCAP files at 1900. Text files that expose all the information elements within each packet are created from the Network Analyzer at 1902. The text files are processed by the Parser at 1906, which is written in Python in the preferred implementation. The results of the parser is a connectivity and routing information file that is imported into the MeshView database, upon which various views of network information are created and displayed to the user through the Java GUI 1908 and Web-based GUI 1910.

Figure 3:
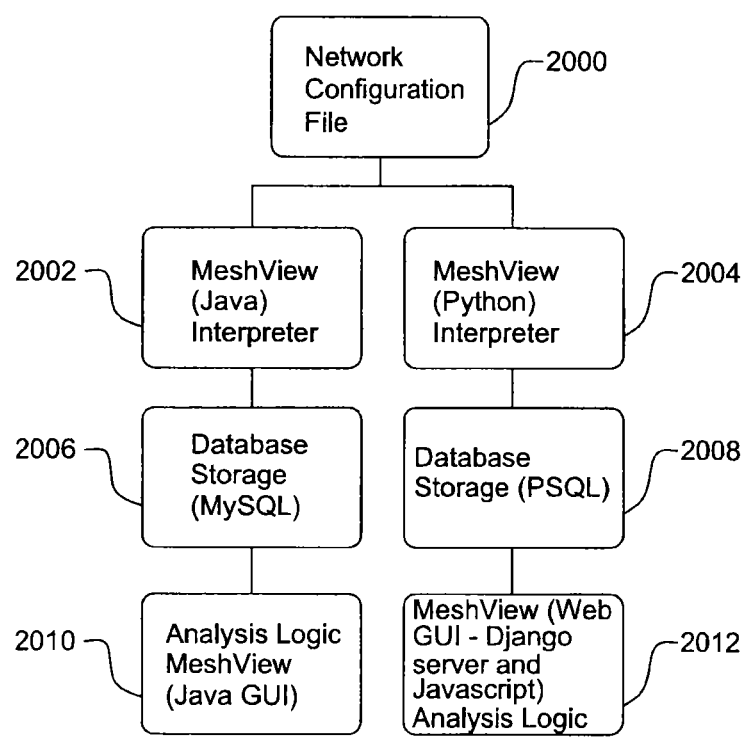
FIG. 3 is a diagram of the processing to create the network configuration data for a MeshView application data processing flow.

In FIG. 3, the MeshView application parses a network configuration file 2000 by using either a Java parser 2002 or a Python parser 2004. Data is stored in a MySQL database 2006 or a PSQL database 2008, respectively. The data is sent to Java GUI 2010 or a web GUI, such as a Django server using Javascript 2012, respectively.

Figure 4:
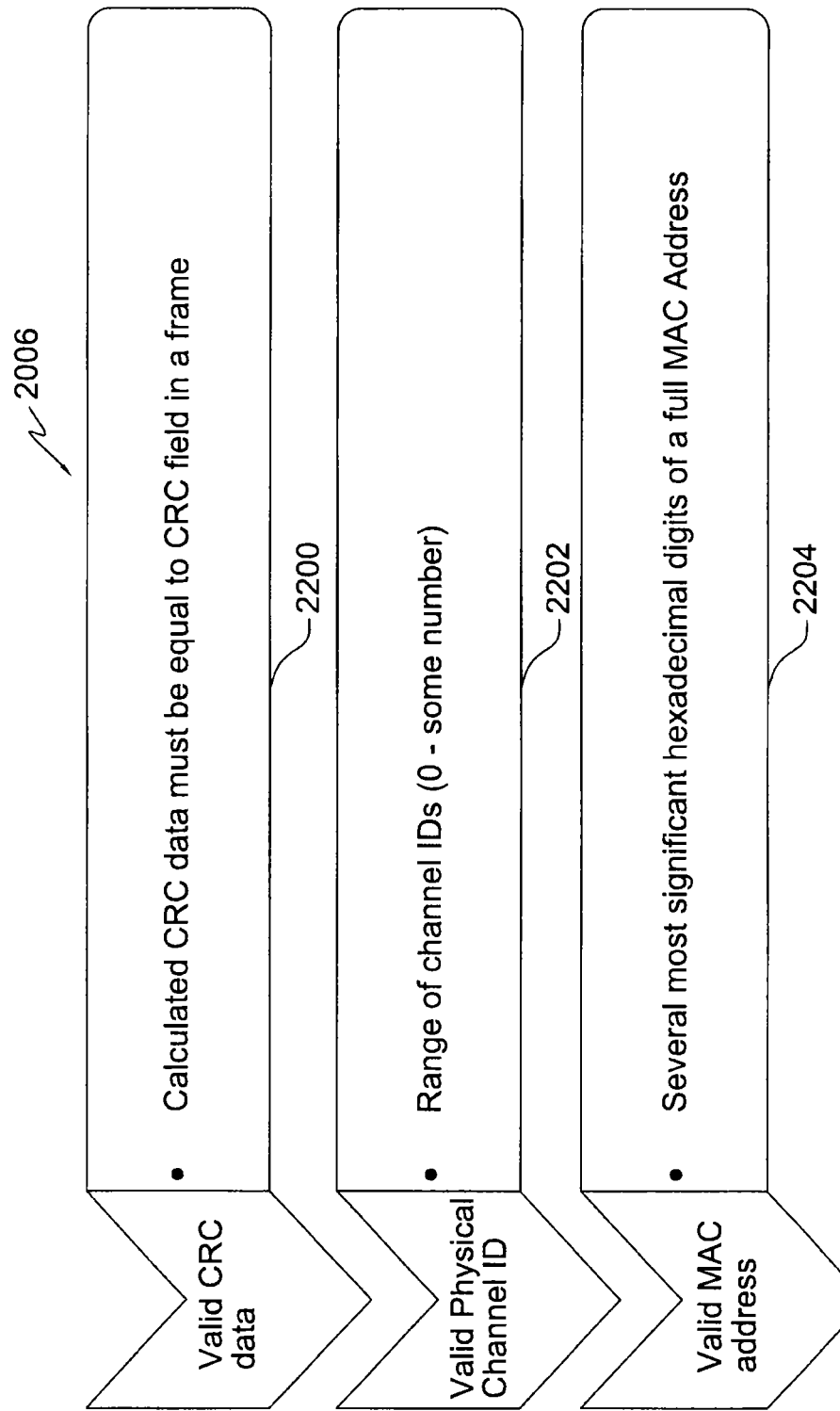
FIG. 4 is a graphical representation of a set of parser filters in the MeshView application.

In FIG. 4 some of the rules for parsing the traffic captures to valid packets and remove the normal occurrence of packet with errors are shown. Only packets with cyclic redundancy check values are accepted if the CRC in the packet matches the calculated CRC. Packets with CRC mismatches have errors and cannot be considered reliable sources of information. Additionally, only packets with, a valid physical channel ID 2202, where the range of channel IDs must be from zero to some predetermined number for the system are accepted in 2202. A Channel ID outside the expected range is an indication of a packet with error, even if the CRC is correct. Finally, only packets with valid MAC addresses, where the most significant hexadecimal digits in the MAC address match expected values are accepted in 2204. MAC addresses with unexpected values are an indicator of packet error or a possible attack.

Figure 5:
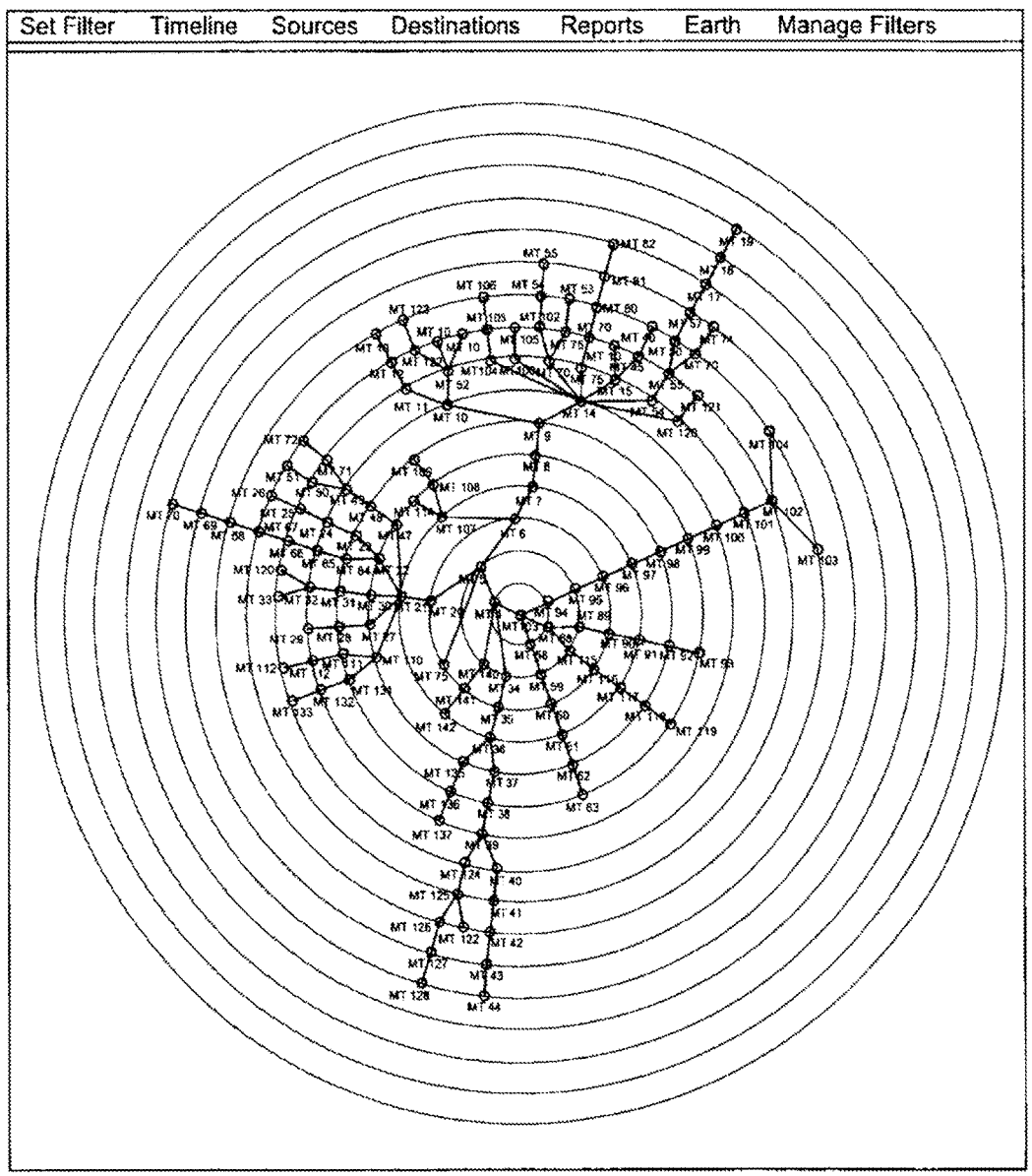
FIG. 5 is a predictive plot of nodes and interconnection of node routes in the MeshView application based on probe traffic

Referring to FIG. 5, the MeshView application constructs both logical and GIS-based connectivity and routing maps. The MeshView application constructs a predictive AP routing map by examining packets that contain source routing information (SRT) and next hop (NH) information for a node. It collects and tracks explicit routes and changes in next hop in time sequence, where a new source route with a change in next hop requires analysis to determine if it impacts any previously seen routes. When a change in next hop occurs, the predictive element of the MeshView application determines which nodes are affected (behind the node with the next hop change), and updates the route for nodes involved. The predictive AP routing map depicts the best estimate of node routes to an AP in a logical form as shown in FIG. 5.

Figure 6:
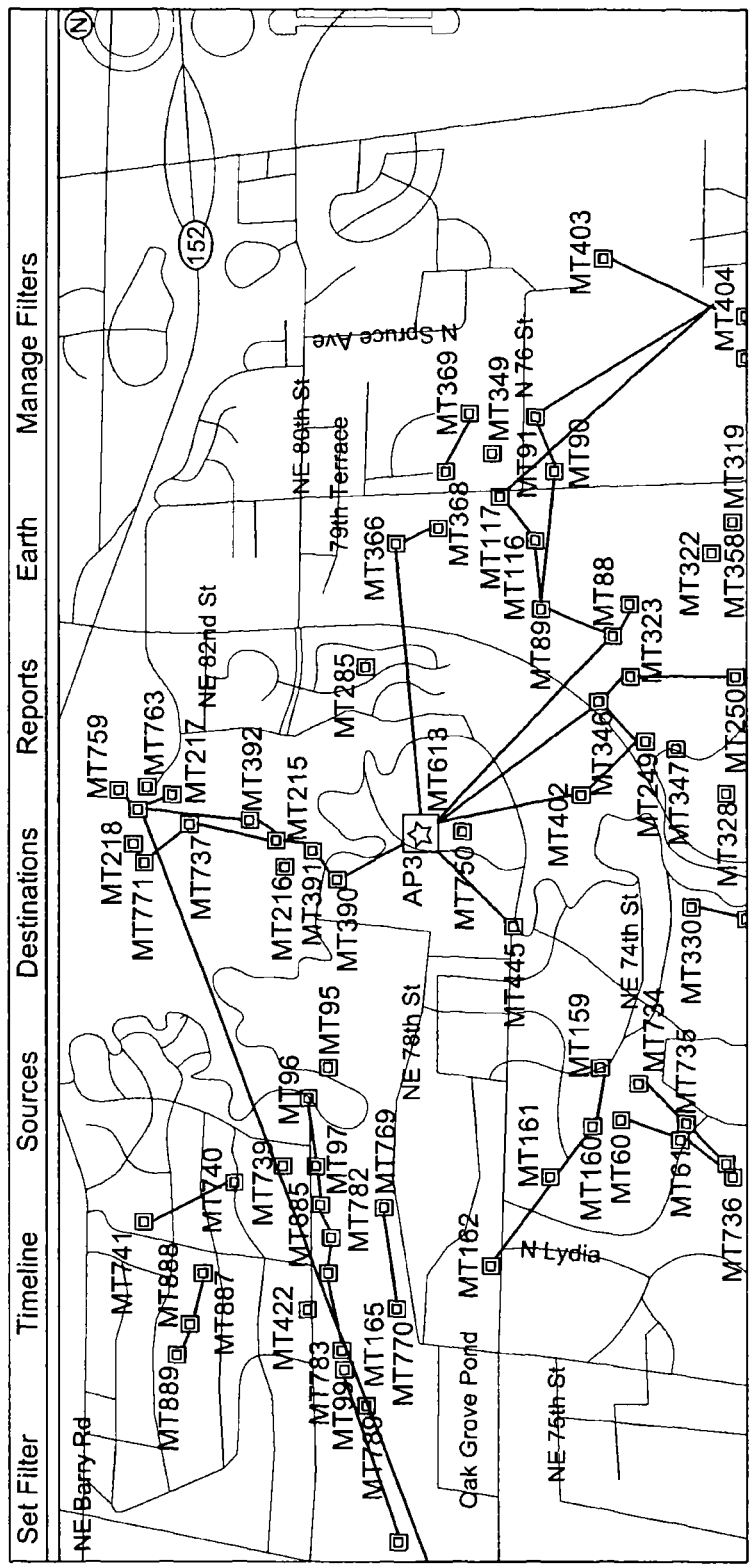
FIG. 6 is a superposition of a portion of nodes and node routes generated from the MeshView application on a terrain image.

FIG. 6 illustrates a portion of the predictive AP routing map shown in FIG. 4, with the addition of geographic coordinates for each node and interconnects of the nodes, plotted by the MeshView application, and superimposed on a Google Earth® map to provide a terrestrial view of a predictive AP routing map.

Figure 7:
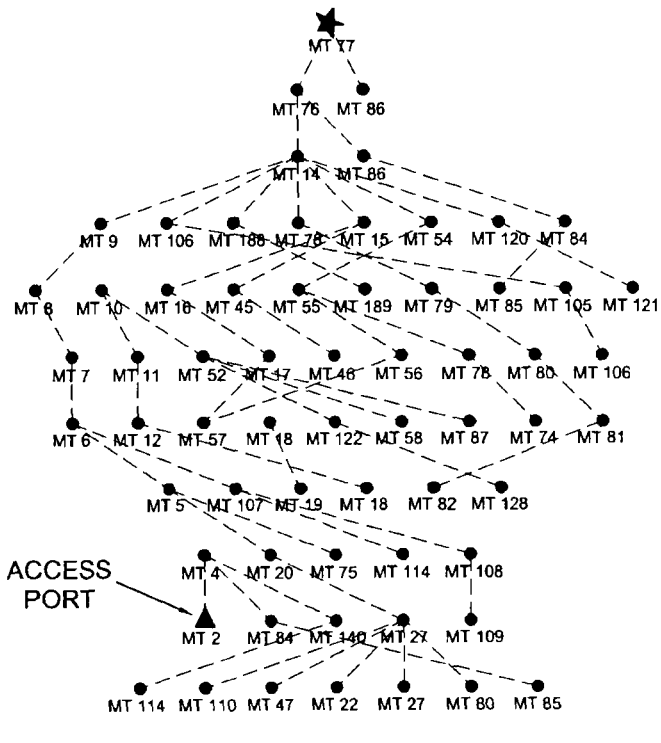
FIG. 7 is screen shot example of a connectivity map generated by the MeshView application from analyzing probe traffic.

FIG. 7 is a screen shot of a connectivity map, with multiple visualization options. The connectivity map permits the user to select a node of interest and display all communications flows for the node that satisfy the filter criteria.

If just AP routing messages are selected, the connectivity map shows a logical mesh based on just AP routes. If all messages are included, the mesh shows all communication to and from a particular node and the resulting fan-out for each node that that the node of interest had engaged through communications Additional features to improve usability especially with large mesh maps include a depth control that allows the user to control the number of hops to display (i.e. the number of rows), the ability to delete a particular node to observe the effect on the mesh (i.e. the number of nodes that are without a path to the node of interest).

Advanced filtering and time playback features enable utilities to quickly focus on data of interest and playback node activity for security analysis, forensics, network operations, network engineering, and field diagnostics. Filters are applied to information extracted from captured packets with timestamps. Key filters include time span, source nodes, destinations, node type, hop count, probe source, customer, and packet type as shown in FIG. 8.

Figure 8:
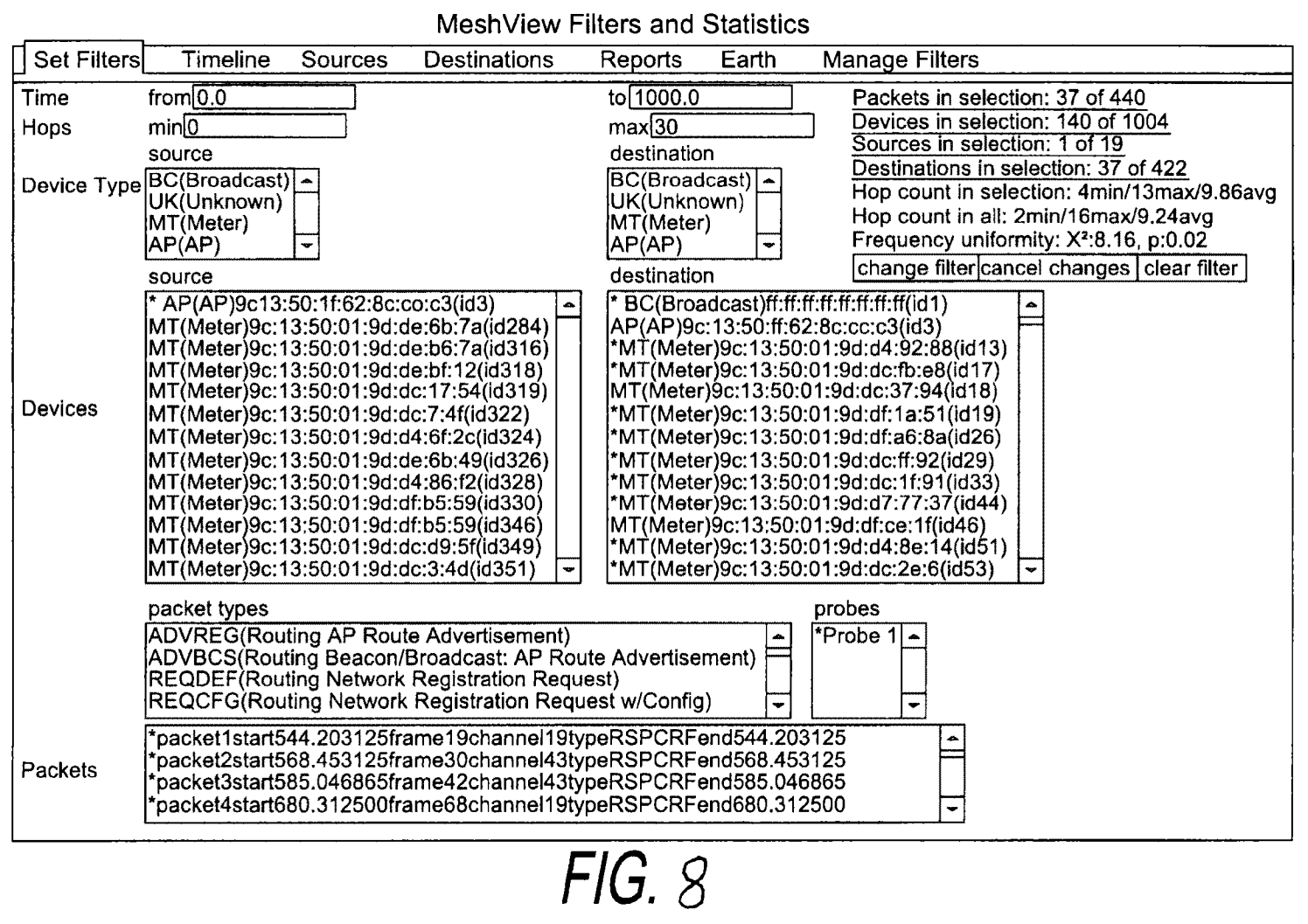

In FIG. 8, statistics about the communications and packets resulting from the filters appears on the right-hand side. Statistics include the number of packets in the selection, the number of sources, the number destinations, hop count min, max and averages. Additionally channel statistics (not show) are extracted to show which frequency channels are used, their utilization, and the degree of uniformity in channel usage using Chi-square statistics.

The MeshView application provides a time lapse or flip book feature that enables users to playback the communications resulting from their filters. In one mode, the user selects a node of interest and observes a movie that flips through each packet that uses the nod of interest as a source, destination or relay. Users can single step through the movie one frame at a time. An important feature is that nodes involved in the playback are pre-determined and pre-positioned so that nodes remain static on the screen and do not change positions with every frame update. This helps to highlight the changes in communication paths. Persistence can be used to leave prior communications on the screen and fade those connections slowly over time.

The MeshView application also enables filter selections to be stored and later recalled to facilitate frequent access to specific slices of data.

Figure 9:
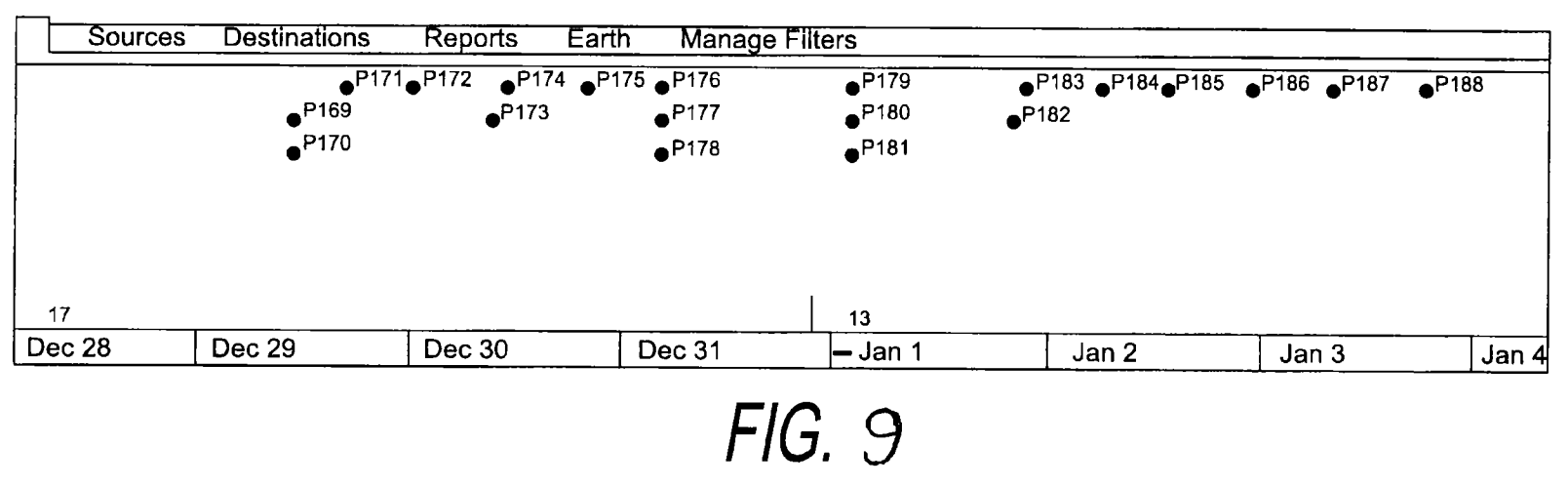

FIG. 9 illustrates a timeline view that shows the packets and communications as they appear in time to easily identify clustering of communications.

The MeshView Web system is comprised of hardware and software components. The hardware components are general purpose server-class computing devices with solid-state hard drives and substantial memory. The software is a combination of open-source frameworks and custom software that performs the specific functionality of the system.

Figure 10:
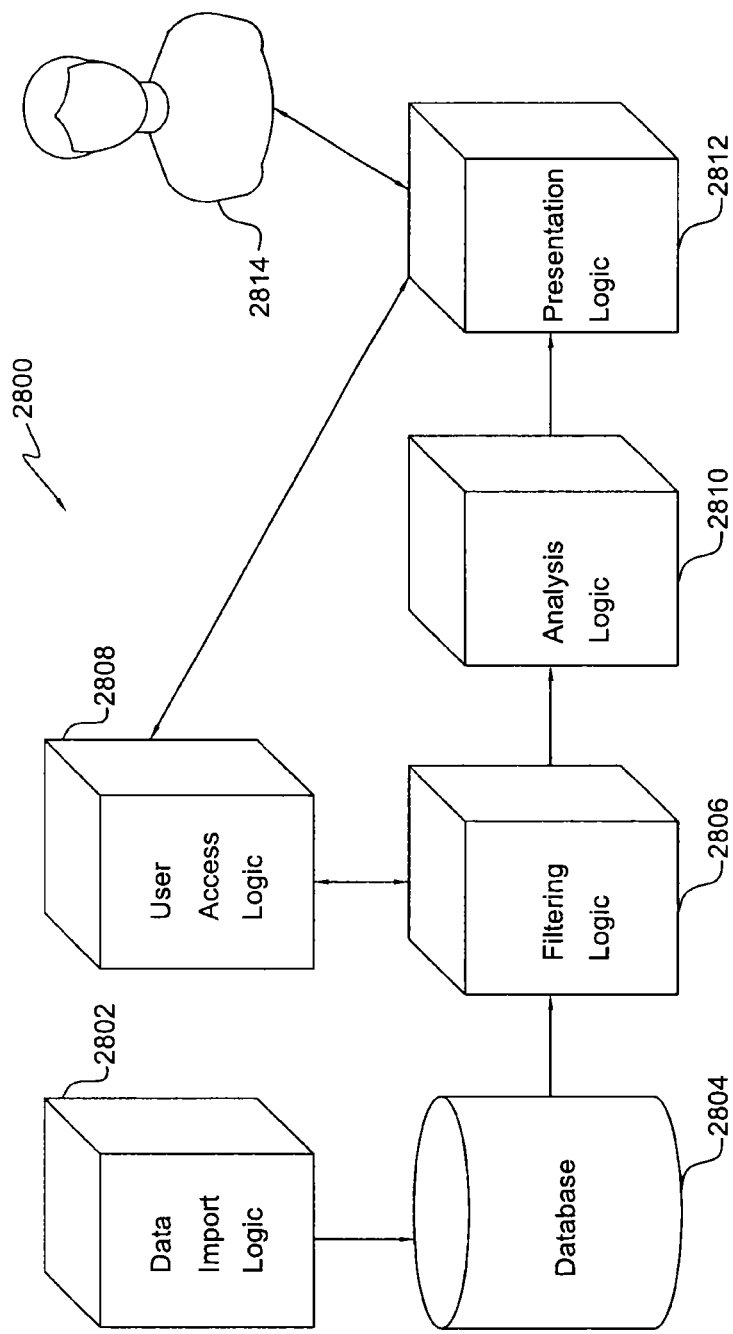
FIG. 10 is a logical block diagram of the components for the MeshView application.

In FIG. 10, the logical block diagram of the components for the mesh view system 2800 is illustrated. Data import logic 2802 is used to import network data from the network configuration file 2100 to a database 2804. Filtering logic 2806 filters the data in accordance with the filters configured by user access logic 2808. Analysis logic 2810 is used to sort and analyze the data. Presentation logic 2812 provides the GUIs that the user 2814 can use to interact with the system, including settings in the user logic 2808.

Open source components include the following:
the Python programming language
the Django web framework
the Postgres database with PostGIS extensions
the Django-tables2 display component
the networkX graphing analysis package from Los Alamos National Laboratory
graphical javascript libraries from the jit.org
the nginx web server with gunicorn worker processes
miscellaneous javascript libraries such as async.js and ready.js
the Scipy statistical analysis package
the Google Earth web plugin and framework Custom software includes:
Methods to import and normalize probe data into the database;
Methods to create, customize, save, and manage filters that restrict data analysis to a subset of packets, based on selected devices, packet types, probes, timeframes, and other characteristics;
Near real-time updates of statistics related to the filtered data;
Creation and visualization of traffic and communications among devices, to include static and dynamic visualization using time-based playback in both abstract and geospatial domains;
Statistical analysis of communications networks, to include detection of non-uniform use of transmission frequencies, abnormal graph characteristics, and other indications of anomalous device or network behavior;
Methods to associate individual system users to a set of data for which they are authorized; and
Logic to optimize performance of the system To import and normalize probe data into the database, custom code receives data regarding network communications in a specific format and ensures its completeness. It then normalizes the data, performs analysis on select fields, and writes them to a database.

To create, customize, save, and manage filters that restrict data analysis to a subset of packets, based on selected devices, packet types, probes, timeframes, and other characteristics, user input is received via a series of web-based forms and constructs filters representing the user selection of packet characteristics. The filters are then used to limit the dataset for further analysis by the system. The user has the option of saving, modifying, adding, loading, or removing filters. The filters can be unique to the user account.

The system can provide dynamic, near real-time updates of statistics relating to the filtered data. These statistics include number of devices in the selection, number of packets, types of data, and other data derived from the selected data such as radio frequency channel statistics and assessments of uniformity.

Filtered network data is used to create static and dynamic graphical visualizations of communications flows, traffic and characteristics, including predictive time-based visualizations using time-based playback of occurrences in network mesh formation. These visualizations are both abstract (using traditional graph and mesh layout) and geospatial, where appropriate, with accurate overlays onto geospatial software, such as, for example, Google Earth, as described above with respect to FIG. 6.

Statistical analysis of filtered data in the communications network is used to detect interesting or anomalous characteristics of the network communication. An example of such analysis is the distribution analysis of radio-frequency communication channels which will detect non-random use of specific communications channels. This is an indication of an operational or security problem. A further example includes detection of non-uniform use of transmission frequencies, abnormal graph characteristics, and other indications of anomalous device or network behavior.

Benefits of the system design and approach disclosed herein include:
Visualizations provide clear, easy-to-understand analytic results that would require pages of text to describe.
Time-based playback provides historical views of data as well as predictive views of future system behavior.

It will be understood that the disclosure may be embodied in a computer readable non-transitory storage medium storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A method for visualizing and analyzing a field area network, the method comprising:
backhauling by a packet intercept system on a field area network, to at least one additional network, a traffic data stream intercepted by the packet intercept system from the field area network,
wherein the field area network comprises an adhoc self-forming network comprised of a plurality of network nodes,
wherein the packet intercept system is comprised of a plurality of probes in the field area network,
wherein the at least one additional network is distinct from the field area network, and
wherein the traffic data stream comprises at least one of: individual packets, packet detail or metadata generated by at least one probe of the plurality of probes, based on processing at least one intercepted packet from the field area network;

extracting, by a processor communicatively coupled to the at least one additional network, connectivity and routing information from the traffic data, wherein the connectivity and routing information comprises packet information and node information;

determining, by the processor, network characteristics based on the extracted connectivity and routing information;

retaining, by the processor, the network characteristics in a data structure;

importing, by the processor, the data structure into a non-transitory computer readable storage medium accessible to the processor;

obtaining, by the processor, a portion of the data structure from the non-transitory computer readable storage medium and generating, by the processor, a visual representation of the field area network viewable on a client communicatively coupled to the processor, wherein the visual representation comprises historical views of data routing through the field area network and predictive views of future routing of the data through the field area network, and wherein generating the visual representation comprises:

constructing, by the processor, a predictive access point routing map, based on continuously examining packets in the intercepted traffic data stream comprising source routing information and next hop information, wherein the predictive access point routing map automatically depicts future routes from one or more network node to an access point on the adhoc self-forming network, the constructing further comprising:

identifying, by the processor, a change in a next hop information sequence for a given network node of the plurality of network nodes in the field area network, wherein the change in the next hop information sequence in based on a new source route;

determining, by the processor, which additional nodes of the plurality of network nodes of the field area network are affected by the change in the next hop information sequence, wherein the affected nodes are behind the given network node in the field area network;

estimating, by the processor, the future routes for each of the affected nodes to the access point, based on the change in next hop information at the given network node; and depicting, by the processor, the predictive access routing map, wherein the predictive access routing map reflects the future routes.

2. The method of claim 1, wherein the plurality of probes intercept one of: a pre-determined percentage of network traffic by sampling channels in the field area network over a time interval, or all network traffic by sampling channels in the field area network over a time interval.

3. The method of claim 2, wherein the plurality of probes comprise one or more of: a probe with a fixed location, a mobile probe.

4. The method of claim 1, wherein the traffic data from the packet intercept system comprises a physical frame, a link layer, a mesh routing layer, a packet encapsulation layer, and an application layer, and wherein the extracting comprises extracting connectivity and routing information from at least one of the group consisting of: the physical frame, the link layer, the mesh routing layer, the packet encapsulation layer, and the application layer.

5. The method of claim 1, wherein the backhauling comprises sampling channels over time without performing a full band capture.

6. The method of claim 1, wherein the portion of the data structure obtained for generating the visual representation is defined by a filter.

7. The method of claim 6, wherein the filter is configured to select network characteristics associated with the individual packets, the packet detail intercepted by one or more probes of the plurality of probes or the metadata generated by at least one probe of the plurality of probes based on parameters associated with the network characteristics.

8. The method of claim 7, wherein the parameters comprise at least one of: a time interval, a start time, a number of packets, a packet source address, a packet destination address, a packet type, a source node device type, a destination node device type, a minimum hop count, a maximum hop count, a geographic position, a radius of inclusion, and a node model type.

9. The method of claim 1, wherein the visual representation comprises at least one of a node connectivity map, a mesh connectivity map, or a timeline chart.

10. The method of claim 1, wherein the visual representation comprises at least one of: communications flows, traffic characteristics, or predictive time-based visualizations, backoffice network nodes, communication flows between a backoffice and at least one of the plurality of network nodes, a chart comprising a distribution of packets along at least a portion of the field area network.

11. The method of claim 9, wherein the visual representation comprises the predictive routing map, the method further comprising:

obtaining, by the processor, an indication of the new source route comprising the change in next hop information;

determining, by the processor, at least one node of the plurality of nodes affected by the new source route; and updating the visual representation to reflect the at least one node.

12. The method of claim 6, further comprising:
retaining the filter in the computer readable storage medium.

13. The method of claim 1, the method further comprising:

obtaining, by the processor, terrestrial information related to locations of the plurality of network nodes and the locations of the plurality of probes; and concurrently displaying the terrestrial information with the visual representation, such that the terrestrial information is superimposed on the visual representation.

14. The method of claim 1, wherein the portion of the data structure comprises connectivity and routing information related to packets intercepted during a predefined interval, and the visual representation comprises simulating network traffic during the predefined interval.

15. The method of claim 1, wherein the traffic data comprises a physical frame, a link layer, a mesh routing layer, a packet encapsulation layer, and an application layer, and wherein the extracting comprises extracting connectivity and routing information from the physical frame, the link layer, the mesh routing layer, the packet encapsulation layer, and the application layer, wherein the network characteristics determined based on the physical frame comprise frequency channel, and virtual network ID, wherein the network characteristics determined based on the link layer provides comprise sources and destination of direct node-to-node communication, type of packet, and timing information regarding future node activity, wherein the network characteristics determined based on the mesh routing layer comprise information on source routed packets, relaying of packets through one or more nodes to reach a destination within a mesh, and routing information for a next hop for a node, wherein the network characteristics determined based on the packet encapsulation layer comprise communication between the mesh into backend networks, and wherein the network characteristics determined based on the application layer comprise information about node configuration, key network server addresses, and events.

16. The method of claim 1, further comprising:
obtaining information about at least one network node of the plurality of network nodes and storing the information in the computer readable storage medium accessible to the processor, wherein the information comprises at least one of: geographic coordinates, MAC address, or node type.

17. A computer system for visualizing and analyzing a field area network, the computer system comprising:
a memory; and
one or more processors in communications with the memory, wherein the computer system is configured to perform a method, said method comprising:
backhauling by a packet intercept system on a field area network, to at least one additional network, a traffic data stream intercepted by the packet intercept system from the field area network,
wherein the field area network comprises an adhoc self-forming network comprised of a plurality of network nodes,
wherein the packet intercept system is comprised of a plurality of probes in the field area network,
wherein the at least one additional network is distinct from the field area network, and
wherein the traffic data stream comprises at least one of: individual packets, packet detail or metadata generated by at least one probe of the plurality of probes, based on processing at least one intercepted packet from the field area network;
extracting, by a processor communicatively coupled to the at least one additional network, connectivity and routing information from the traffic data, wherein the connectivity and routing information comprises packet information and node information;
determining, by the processor, network characteristics based on the extracted connectivity and routing information;
retaining, by the processor, the network characteristics in a data structure;
importing, by the processor, the data structure into a non-transitory computer readable storage medium accessible to the processor;
obtaining, by the processor, a portion of the data structure from the non-transitory computer readable storage medium and generating, by the processor, a visual representation of the field area network viewable on a client communicatively coupled to the processor, wherein the visual representation comprises historical views of data routing through the field area network and predictive views of future routing of the data through the field area network, and wherein generating the visual representation comprises:
constructing, by the processor, a predictive access point routing map, based on continuously examining packets in the intercepted traffic data stream comprising source routing information and next hop information, wherein the predictive access point routing map automatically depicts future routes from one or more network node to an access point on the adhoc self-forming network, the constructing further comprising:
identifying, by the processor, a change in a next hop information sequence for a given network node of the plurality of network nodes in the field area network, wherein the change in the next hop information sequence in based on a new source route;
determining, by the processor, which additional nodes of the plurality of network nodes of the field area network are affected by the change in the next hop information sequence, wherein the affected nodes are behind the given network node in the field area network;
estimating, by the processor, the future routes for each of the affected nodes to the access point, based on the change in next hop information at the given network node; and
depicting, by the processor, the predictive access routing map, wherein the predictive access routing map reflects the future routes.

18. The computer system of claim 17, wherein the plurality of probes intercept one of: a pre-determined percentage of network traffic by sampling channels in the field area network over a time interval, or all network traffic by sampling channels in the field area network over a time interval.

19. The computer system of claim 17, wherein the backhauling comprises sampling channels over time without performing a full band capture.

20. A computer program product for visualizing and analyzing a field area network, the computer program product comprising:
a non-transitory computer readable storage medium readable by a processing circuit and storing instructions for execution by the processing circuit for performing a method comprising:
backhauling by a packet intercept system on a field area network, to at least one additional network, a traffic data stream intercepted by the packet intercept system from the field area network,
wherein the field area network comprises an adhoc self-forming network comprised of a plurality of network nodes,
wherein the packet intercept system is comprised of a plurality of probes in the field area network,
wherein the at least one additional network is distinct from the field area network, and
wherein the traffic data stream comprises at least one of: individual packets, packet detail or metadata generated by at least one probe of the plurality of probes, based on processing at least one intercepted packet from the field area network;

extracting, by a processor communicatively coupled to the at least one additional network, connectivity and routing information from the traffic data, wherein the connectivity and routing information comprises packet information and node information;

determining, by the processor, network characteristics based on the extracted connectivity and routing information;

retaining, by the processor, the network characteristics in a data structure;

importing, by the processor, the data structure into the non-transitory computer readable storage medium accessible to the processor;

obtaining, by the processor, a portion of the data structure from the non-transitory computer readable storage medium and generating, by the processor, a visual representation of the field area network viewable on a client communicatively coupled to the processor, wherein the visual representation comprises historical views of data routing through the field area network and predictive views of future routing of the data through the field area network, and wherein generating the visual representation comprises:

constructing, by the processor, a predictive access point routing map, based on continuously examining packets in the intercepted traffic data stream comprising source routing information and next hop information, wherein the predictive access point routing map automatically depicts future routes from one or more network node to an access point on the adhoc self-forming network, the constructing further comprising:

identifying, by the processor, a change in a next hop information sequence for a given network node of the plurality of network nodes in the field area network, wherein the change in the next hop information sequence in based on a new source route;

determining, by the processor, which additional nodes of the plurality of network nodes of the field area network are affected by the change in the next hop information sequence, wherein the affected nodes are behind the given network node in the field area network;

estimating, by the processor, the future routes for each of the affected nodes to the access point, based on the change in next hop information at the given network node, and depicting, by the processor, the predictive access routing map, wherein the predictive access routing map reflects the future routes.

* * * * *